United States Patent
Sennett et al.

(10) Patent No.: US 8,761,992 B2
(45) Date of Patent: Jun. 24, 2014

(54) BROADCAST OF AUTOMOBILE RELATED INFORMATION

(75) Inventors: DeWayne Allan Sennett, Redmond, WA (US); Brian Kevin Daly, Peachtree Corners, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 961 days.

(21) Appl. No.: 12/056,504

(22) Filed: Mar. 27, 2008

(65) Prior Publication Data
US 2009/0248232 A1  Oct. 1, 2009

(51) Int. Cl.
*G01M 17/00* (2006.01)
*B60R 25/33* (2013.01)
*B60R 25/102* (2013.01)

(52) U.S. Cl.
CPC ........... *B60R 25/33* (2013.01); *B60R 2325/205* (2013.01); *B60R 25/102* (2013.01)
USPC ....... 701/29.1; 701/29.4; 701/29.6; 701/29.7; 701/31.5; 701/33.2; 340/438; 455/566

(58) Field of Classification Search
USPC ........ 701/1, 29, 33, 35, 117, 29.1, 29.4, 29.6, 701/29.7, 33.1; 455/404.1
See application file for complete search history.

(56) References Cited

U.S. PATENT DOCUMENTS

| | | | |
|---|---|---|---|
| 5,442,553 A * | 8/1995 | Parrillo | 455/420 |
| 5,583,844 A * | 12/1996 | Wolf et al. | 701/1 |
| 6,073,007 A * | 6/2000 | Doyle | 455/412.2 |
| 6,233,506 B1 * | 5/2001 | Obradovich et al. | 701/1 |
| 6,278,936 B1 | 8/2001 | Jones | |
| 6,401,027 B1 * | 6/2002 | Xu et al. | 701/117 |
| 6,411,891 B1 | 6/2002 | Jones | |
| 6,542,077 B2 * | 4/2003 | Joao | 340/426.16 |
| 6,594,579 B1 | 7/2003 | Lowrey et al. | |
| 6,604,033 B1 | 8/2003 | Banet et al. | |
| 6,618,668 B1 | 9/2003 | Laird | |
| 6,636,790 B1 | 10/2003 | Lightner et al. | |
| 6,701,232 B2 * | 3/2004 | Yamaki | 701/33.8 |
| 6,711,399 B1 * | 3/2004 | Granier | 455/404.1 |
| 6,714,859 B2 | 3/2004 | Jones | |
| 6,732,031 B1 | 5/2004 | Lightner et al. | |
| 6,741,927 B2 | 5/2004 | Jones | |
| 6,804,606 B2 | 10/2004 | Jones | |
| 6,847,872 B2 * | 1/2005 | Bodin et al. | 701/31.4 |
| 6,847,906 B2 * | 1/2005 | Ozawa | 702/81 |
| 6,859,726 B2 * | 2/2005 | Choi | 701/410 |
| 6,952,645 B1 | 10/2005 | Jones | |
| 6,959,173 B2 * | 10/2005 | Kawai | 455/95 |
| 7,030,781 B2 | 4/2006 | Jones | |
| 7,050,903 B1 * | 5/2006 | Shutter et al. | 701/117 |
| 7,212,916 B2 * | 5/2007 | Alewine et al. | 701/117 |
| 7,480,551 B1 | 1/2009 | Lowrey et al. | |
| 7,532,962 B1 * | 5/2009 | Lowrey et al. | 701/32.3 |

(Continued)

*Primary Examiner* — Redhwan K Mawari
(74) *Attorney, Agent, or Firm* — Baker & Hostetler LLP

(57) ABSTRACT

Through the present subject matter, mobile devices subscribers may be provided information pertaining to a motor vehicle. The characteristics of the motor vehicle are monitored. The information indicative of the monitored characteristics is sent to an entity that is not performing the monitoring of the motor vehicle. The mobile device subscriber may also choose more than one individual to receive the information. The system for providing information pertaining to a motor vehicle has additional features such as a qualification system that will prevent the motor vehicle from starting if the appropriate qualifying information is not entered; and may be configured with multi-media communications capabilities.

21 Claims, 7 Drawing Sheets

(56) References Cited

U.S. PATENT DOCUMENTS

| | | | |
|---|---|---|---|
| 7,819,003 B2* | 10/2010 | Breed et al. | 73/290 V |
| 2002/0110146 A1* | 8/2002 | Thayer et al. | 370/465 |
| 2002/0133273 A1* | 9/2002 | Lowrey et al. | 701/29 |
| 2002/0143447 A1* | 10/2002 | Miller | 701/35 |
| 2003/0028297 A1* | 2/2003 | Iihoshi et al. | 701/33 |
| 2003/0103524 A1* | 6/2003 | Hasegawa | 370/465 |
| 2003/0139909 A1* | 7/2003 | Ozawa | 702/183 |
| 2004/0010358 A1* | 1/2004 | Oesterling et al. | 701/49 |
| 2004/0036582 A1* | 2/2004 | Harvey et al. | 340/426.1 |
| 2004/0204795 A1* | 10/2004 | Harvey et al. | 701/1 |
| 2004/0210757 A1* | 10/2004 | Kogan et al. | 713/182 |
| 2006/0129283 A1* | 6/2006 | Alewine et al. | 701/1 |
| 2006/0229777 A1* | 10/2006 | Hudson et al. | 701/29 |
| 2007/0158128 A1* | 7/2007 | Gratz et al. | 180/287 |
| 2008/0084334 A1* | 4/2008 | Ballew | 340/990 |
| 2008/0270519 A1* | 10/2008 | Ekdahl et al. | 709/203 |
| 2009/0019502 A1* | 1/2009 | Liu et al. | 725/109 |
| 2009/0248232 A1* | 10/2009 | Sennett et al. | 701/29 |
| 2009/0298547 A1* | 12/2009 | Kim et al. | 455/566 |

* cited by examiner

BROADCAST OF AUTOMOBILE RELATED INFORMATION

TECHNICAL FIELD

The technical field generally relates to communications systems and more specifically relates to systems and methods for providing information pertaining to a motor vehicle via a communications network, such as a cellular communications network.

BACKGROUND

Today mobile communications devices, such as mobile telephones, are commonplace. Mobile telephones may have the ability to take pictures, send emails, store music, and keep schedules. Another way to integrate mobile telephones into our busy lives is to permit a subscriber or an entity selected by the mobile telephone subscriber to monitor a motor vehicle's use from the mobile telephone in real time. Current technologies require a third party company to monitor a motor vehicle's use. However, current technologies do not permit the mobile telephone subscriber to choose who receives the monitored information.

SUMMARY

Information pertaining to a motor vehicle is provided to a subscriber of a mobile device or to an entity selected by the mobile device subscriber. Information such as the location of the vehicle, whether the vehicle is being handled outside of predetermined parameters, and whether the vehicle is operating within recommended motor vehicle manufacturer parameters is relayed to the mobile device subscriber. The information may be monitored in real-time. It may be related to a selected entity periodically, upon the occurrence of an event, or upon the request of the selected entity. In one embodiment, the driver of the motor vehicle may be required to enter qualifying information into a qualifying system. If the qualification information entered is not correct, the vehicle will not start. In another embodiment, the system may be capable of multi-media communications with the entity receiving the information.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods, employed, the term should not be interpreted as implying any particular order among or between various steps herein disclosed unless and except when the order of individual steps is explicitly described. It should be understood that the explanations illustrating data or signal flows are only exemplary. The following description is illustrative and non-limiting to any one aspect.

Figure 1:
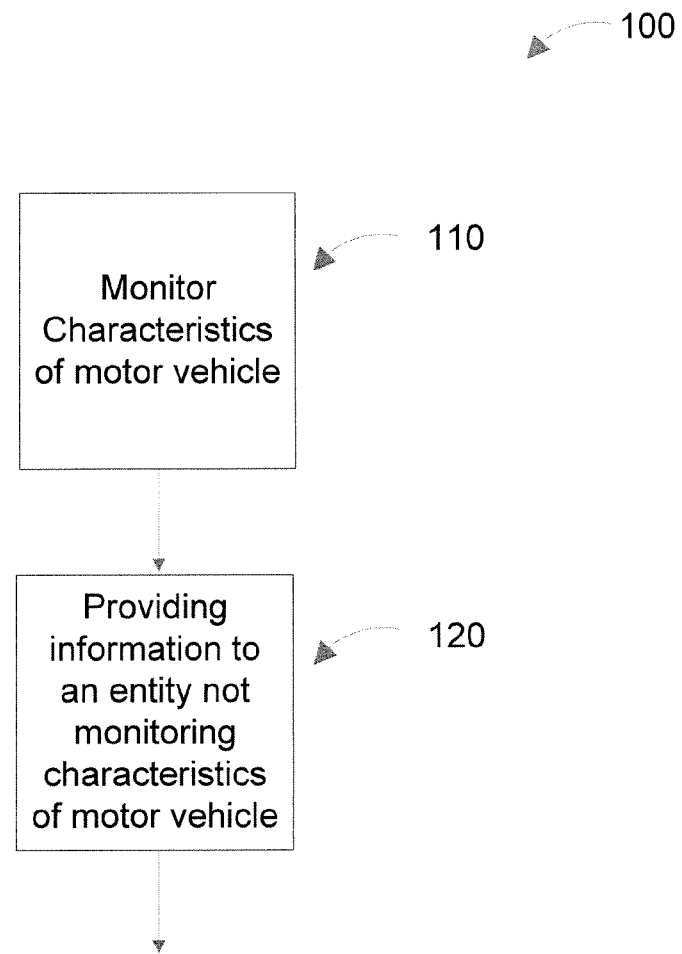
FIG. 1 is a flow diagram of an exemplary, non-limiting method of implementing the present subject matter.

In FIG. 1, an non-limiting exemplary method 100 of providing information pertaining to a motor vehicle via a communications network, such as a communications network is illustrated. Step 110 represents the monitoring of the characteristics of a motor vehicle using the instant system. At step 120, the information indicative of at least one monitored characteristic may be provided to an entity that is not monitoring the characteristics of the motor vehicle. A motor vehicle may be monitored in a variety of ways including, but not limited to the ways described herein.

Figure 2:
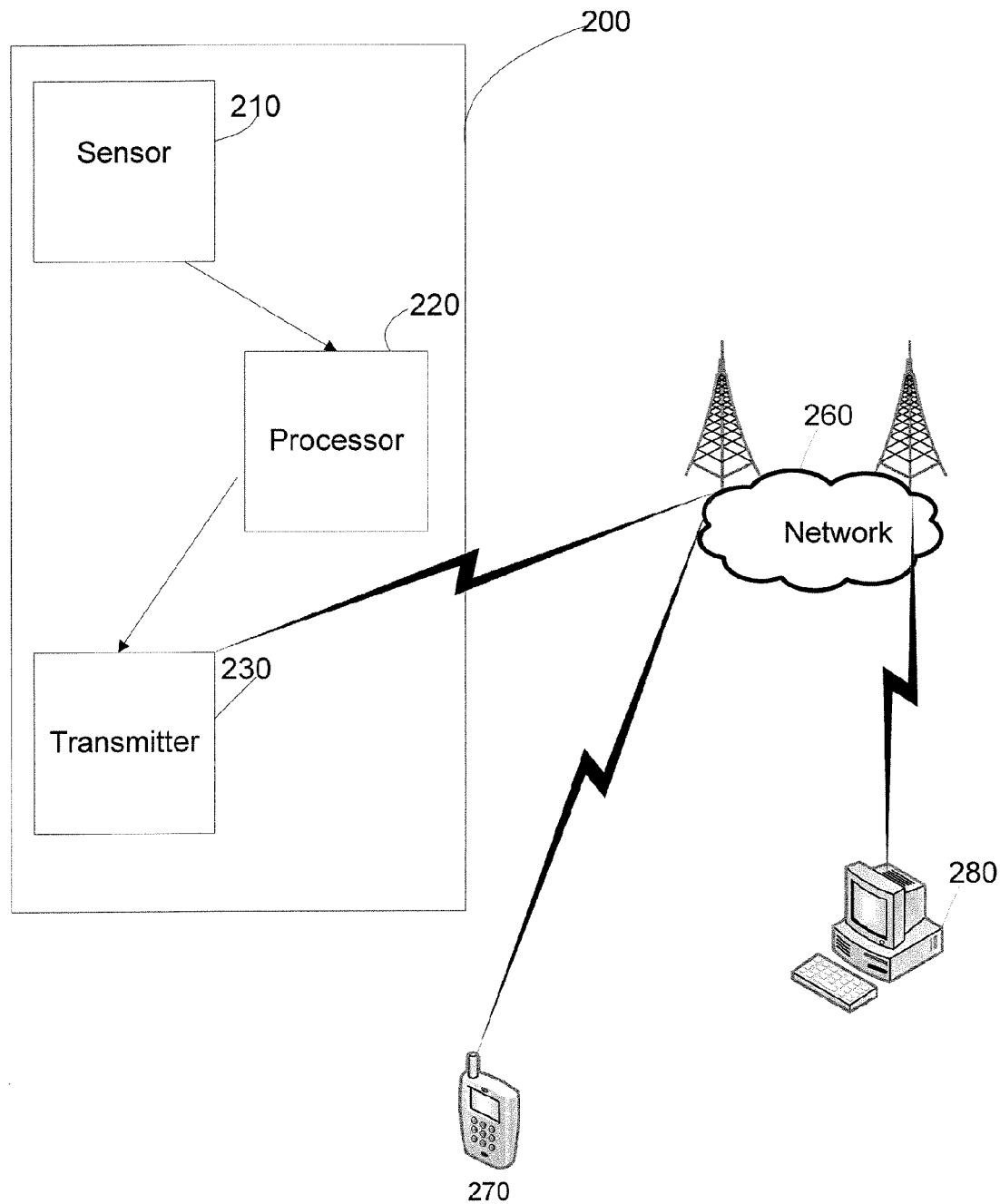
FIG. 2 illustrates an architecture of a system implementing the present subject matter.

As illustrated in FIG. 2, the motor vehicle 200 may contain a sensor 210 which detects the characteristics and sends the characteristics to a processor 220 that may monitor the motor vehicle 200. Monitoring the motor vehicle includes evaluating whether the motor vehicle 200 is outside a normal range of operation (e.g., the location of a taxi or a delivery van), whether the motor vehicle is being handled outside of predetermined parameters (e.g., too fast, too sharp of turns), whether the vehicle is being operated within the motor vehicle manufacturer's recommended parameters (engine temperature, oil level, tire pressure), remaining fuel, air bag deployment or the like. The characteristics that have been monitored by the processor 220 may be sent to a transmitter 230 and then transmitted to a communications network 260. Monitoring of the motor vehicle characteristics may occur in real-time. The monitored characteristics may be provided to a mobile device 270, a computer 280, or to another communication means.

Mobile device 270 may be any wireless mobile communications device that communicates with other devices using a wireless network. Examples of such devices include, but are not limited to, mobile telephones, mobile computers, personal data assistants ("PDA"s), navigation systems, and wirelessly networked computers. Any device which can communicate with any other device by communicating, at least in part, wirelessly with a wireless network is contemplated as being within the scope of the present disclosure.

Figure 3:
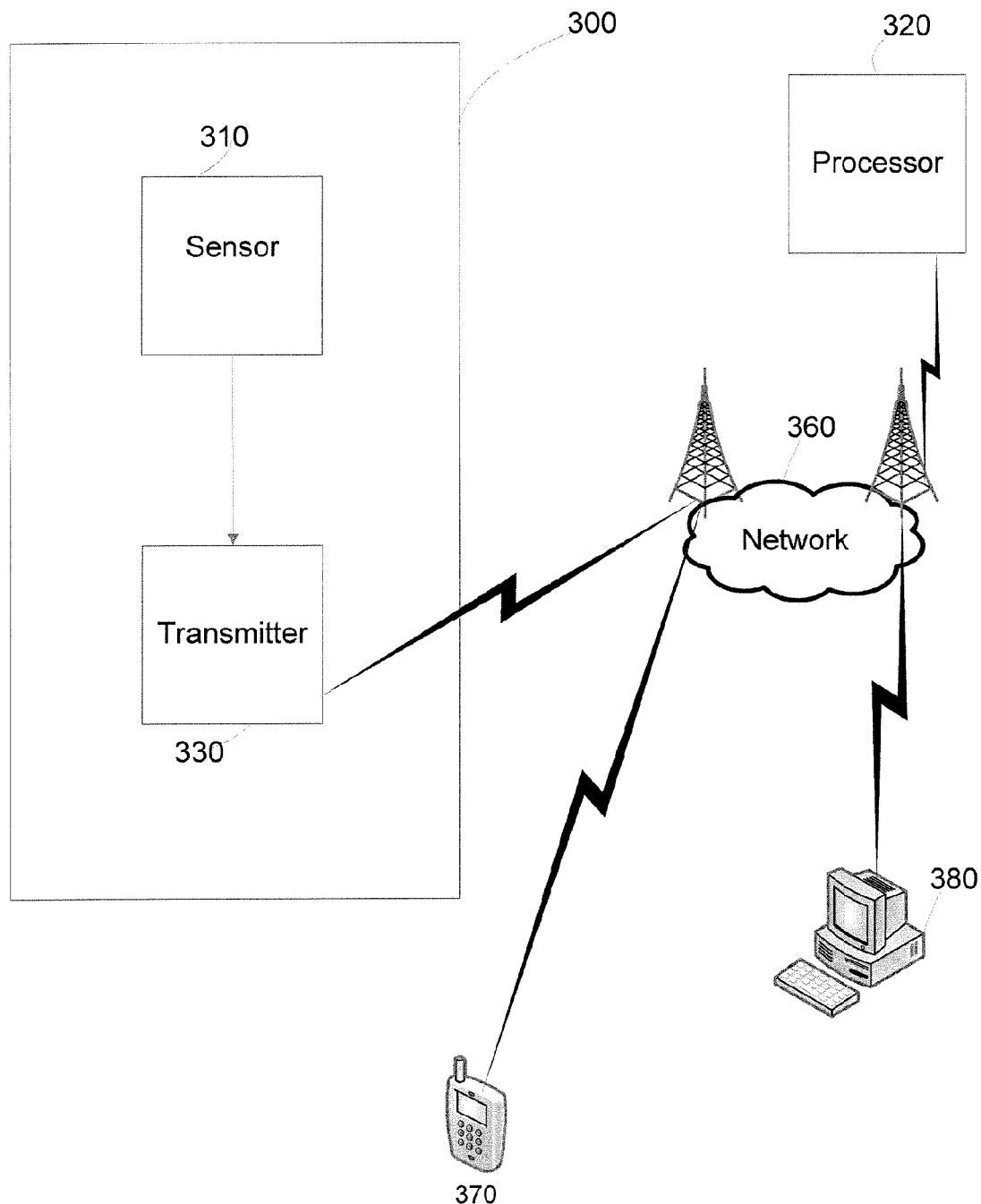
FIG. 3 illustrates an alternate architecture of a system implementing the present subject matter.

Alternatively, in FIG. 3, the motor vehicle 300 may contain a sensor 310 which detects the characteristics and sends the characteristics to a transmitter 330. The characteristics may be sent from the transmitter 330 to a communications network 360 and then to a processor 320 for monitoring of the motor vehicle 300. Information about the vehicle, such as deployment of a vehicle airbag, whether the vehicle is outside a normal range of operation (e.g., the location of a taxi or a delivery van), whether the vehicle is being handled outside of predetermined parameters (e.g., too fast, too sharp of turns), whether the vehicle is being operated within the motor vehicle manufacturer's recommended parameters (engine temperature, oil level, tire pressure), remaining fuel, air bag deployment or the like is collected. Monitoring of the motor vehicle characteristics may occur in real-time. The monitored characteristics may be provided to a mobile device 370, a computer 380, or another communications means.

The mobile device user or an entity to receive the information may use the system for providing information pertaining to a motor vehicle via a communications network in a variety of scenarios. For example, the entity (a parent) can monitor the activities and location of a teenage child who has borrowed the family car; the entity (a package delivery service company) can monitor the location of its drivers on a delivery/pick-up route; the entity (owner of the motor vehicle) will be informed that it is time to perform maintenance on the motor vehicle by a mechanic. The entity can also use the instant system to determine the location of a motor vehicle for emergency purposes and/or to locate a stolen vehicle.

The first embodiment comprises a method of providing information pertaining to a motor vehicle, the method comprising monitoring characteristics of the motor vehicle; and providing the information to an entity that is not monitoring characteristics of the motor vehicle where the information is indicative of at least one monitored characteristic. The monitoring of characteristics of the motor vehicle may comprise monitoring the motor vehicle in real-time. Monitoring characteristics of the motor vehicle may also include determining if the motor vehicle is outside normal range of operation; determining if the motor vehicle is being handled outside of a predetermined parameter; determining if the motor vehicle is operating within a recommended motor vehicle manufacturer parameter, or combinations thereof. It may be determined whether the motor vehicle is operating properly or being operated properly by comparing the monitored characteristics to the motor vehicle's normal range of operation, predetermined parameters, and the recommended motor vehicle manufacture parameters.

In one embodiment, providing the information to the entity comprises receiving a request from a network server; and providing the information to a wireless communications device upon the request from the network server. This request from the network server may occur automatically. In another embodiment, providing the information to the entity comprises providing the information to the entity periodically, for example once a week or once a month; providing the information to the entity upon an occurrence of an event; or providing the information to the entity upon request from the entity. An occurrence of an event can encompass a motor vehicle going outside of its approved area of travel, if the motor vehicle begins speeding, or if the air bag is deployed.

In another embodiment, the method further comprises selecting the entity to receive the information. For example, the mobile device subscriber may select one or more entities other than himself to receive the information. In one instance, a taxi cab owner may select a dispatcher to receive the information so that he can monitor the location of driver or other characteristics of the taxi cab while it is in use. The mobile device subscriber can select the entity or entities to receive the information by making the selection at a web page or using a mobile device. In yet another embodiment, the present subject matter further comprises a qualification system that keeps the motor vehicle from starting. The qualification system may have the ability to accept qualifying information that determines if the motor vehicle will start. Parents may have the family car programmed such that a child cannot start the vehicle while the parents are away for the weekend or such that the motor vehicle will not start if an alcohol sensor detects alcohol on the breath of the driver.

A further embodiment also comprises conducting multimedia communications with the entity. Here, a parent may have the capability to see what a child is doing in the motor vehicle while driving through the use of a web-camera. Voice and other communications may also be available.

The present subject matter also includes a system of providing information pertaining to a motor vehicle, the system includes a processor portion configured to monitor characteristics of the motor vehicle; and an output portion configured to provide the information to an entity that is not monitoring characteristics of the motor vehicle, wherein the information is indicative of at least one monitored characteristic.

In one embodiment, the processor portion configured to monitor characteristics of the motor vehicle comprises a processor portion configured to monitor the motor vehicle in real-time. The processor portion configured to monitor characteristics of the motor vehicle may comprises a processor portion configured to determine if the motor vehicle is outside normal range of operation; a processor portion configured to determine if the motor vehicle is being handled outside of a predetermined parameter; a processor portion configured to determine if the motor vehicle is operating within a recommended motor vehicle manufacturer parameter, or a combination thereof. The respective processor portions may compare the monitored characteristics to the motor vehicle's normal range of operation, predetermined parameters, and recommended motor vehicle manufacture parameters.

In another embodiment, the output portion configured to provide the information to the entity comprises an output portion configured to receive a request from a network server, and an output portion configured to provide the information to a wireless communications device upon the request from the network server. This request from the network server may occur automatically. In some embodiments, the output portion configured to provide the information to the entity comprises an output portion configured to provide the information to the entity periodically, an output portion configured to provide the information to the entity upon an occurrence of an event, and an output portion configured to provide the information to the entity upon the request of the entity. An occurrence of an event can encompass a motor vehicle going outside of its approved area of travel, if the motor vehicle begins speeding, or if the air bag deployed.

In still another embodiment, the system further comprises an input portion configured to select the entity to receive the information. One or more entities other than the mobile device subscriber may be selected to receive the information. The input portion may be a web page or a mobile device where the mobile subscriber can select the entity or entities to receive the information. In yet another embodiment, the system further comprises a qualification system that keeps the motor vehicle from starting. In some embodiments, the qualification system may accept qualifying information that determines if the motor vehicle will start. The qualification system may have the ability to accept qualifying information that determines if the motor vehicle will start. The system may allow parents to program the family car such that a child cannot start the motor vehicle while they are away for the weekend or such that the motor vehicle will not start if an alcohol sensor detects alcohol on the breath of the driver.

In an embodiment of the present system, the system may further comprise an input/output portion configured to conduct multi-media communications with the entity. Here the system may have a web-camera, voice or other communications means.

The present subject matter also encompasses a computer-readable storage medium having stored thereon computer-readable executable instructions for performing the steps of monitoring characteristics of the motor vehicle, and providing the information to an entity that is not monitoring characteristics of the motor vehicle, wherein the information is indicative of at least one monitored characteristic. The computer-readable storage medium has the capability to monitor the motor vehicle in real-time. Monitoring characteristics of the motor vehicle may also comprise determining if the motor vehicle is outside normal range of operation, determining if the motor vehicle is being handled outside of a predetermined parameter, or determining if the motor vehicle is operating within a recommended motor vehicle manufacturer parameter.

In one embodiment, the computer-readable executable instructions for providing the information to the entity comprises receiving a request from a network server, and providing the information to a wireless communications device upon the request from the network server. In another embodiment, providing the information to the entity comprises providing the information to the entity periodically, providing the information to the entity upon an occurrence of an event, and providing the information to the entity upon request from the entity.

Some embodiments further comprise computer-executable instructions to select the entity to receive the information. The computer-executable instructions may be provided at a web page or a mobile device where the mobile device subscriber can select the entity to receive the information. Other embodiments further comprise computer-executable instructions for a qualification system that keeps the motor vehicle from starting. In yet another embodiment, the qualification system accepts qualifying information that determines if the motor vehicle will start. In further embodiments, the computer-readable storage medium may include computer-executable instructions for conducting multi-media communications with the entity.

All of the methods and processes described herein in regard to providing information pertaining to a motor vehicle may be performed entirely on a mobile device, entirely on the provider's network, or using a combination of the two.

Figure 4:
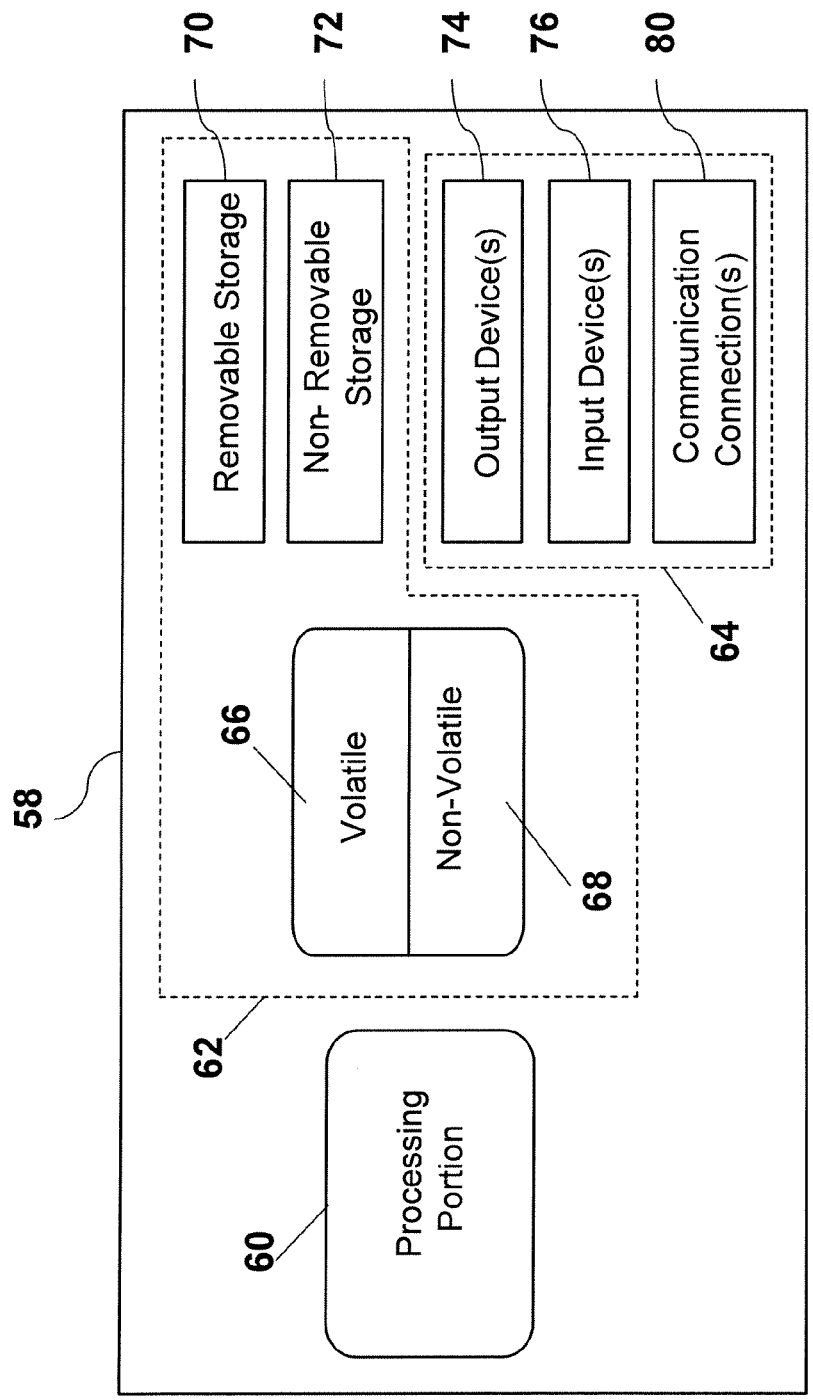
FIG. 4 is a block diagram of an example processor.

FIG. 4 is a block diagram of an example processor 58 for providing information pertaining to a motor vehicle via a communications network. In an example configuration, the processor 58 may be one or more components of a mobile device 270, 370, navigation system, and devices within wireless provider network. It is emphasized that the block diagram depicted in FIG. 4 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 4) to allow communications therebetween. The input/output portion 64 is capable of providing and/or receiving components utilized to provide information pertaining to a motor vehicle. For example, the input/output portion 64 is capable of transmitting/receiving notifications of vehicle location, vehicle speed, driver sobriety, et cetera, or any combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with providing information pertaining to a motor vehicle. For example, as described above, the memory portion is capable of storing the monitored characteristics before the information is sent to an entity. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain the communications connection(s) 80 that allow the processor 58 to communicate with other devices, for example through wireless provider network. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land-line telephone, and wireless media such as acoustic, RF, infrared, cellular, and other wireless media. The term computer readable media as used herein includes both storage media and communication media. The processor 58 also can have input device(s) 76 such as keyboard, keypad, mouse, pen, voice input device, touch input device, etc. Output device(s) 74 such as a display, speakers, printer, etc. also can be included.

The following description sets forth some exemplary telephony radio networks and non-limiting operating environments in which a system for providing information pertaining to a motor vehicle can be implemented. The below-described operating environments should be considered non-exhaustive, however, and thus the below-described network architectures merely show how a system for providing information pertaining to a motor vehicle can be incorporated into existing network structures and architectures. It can be appreciated, however, that the present subject matter can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS channel assignment can be applied independently of the method for data transport, and do not depend on any particular network architecture, or underlying protocols.

Figure 5:
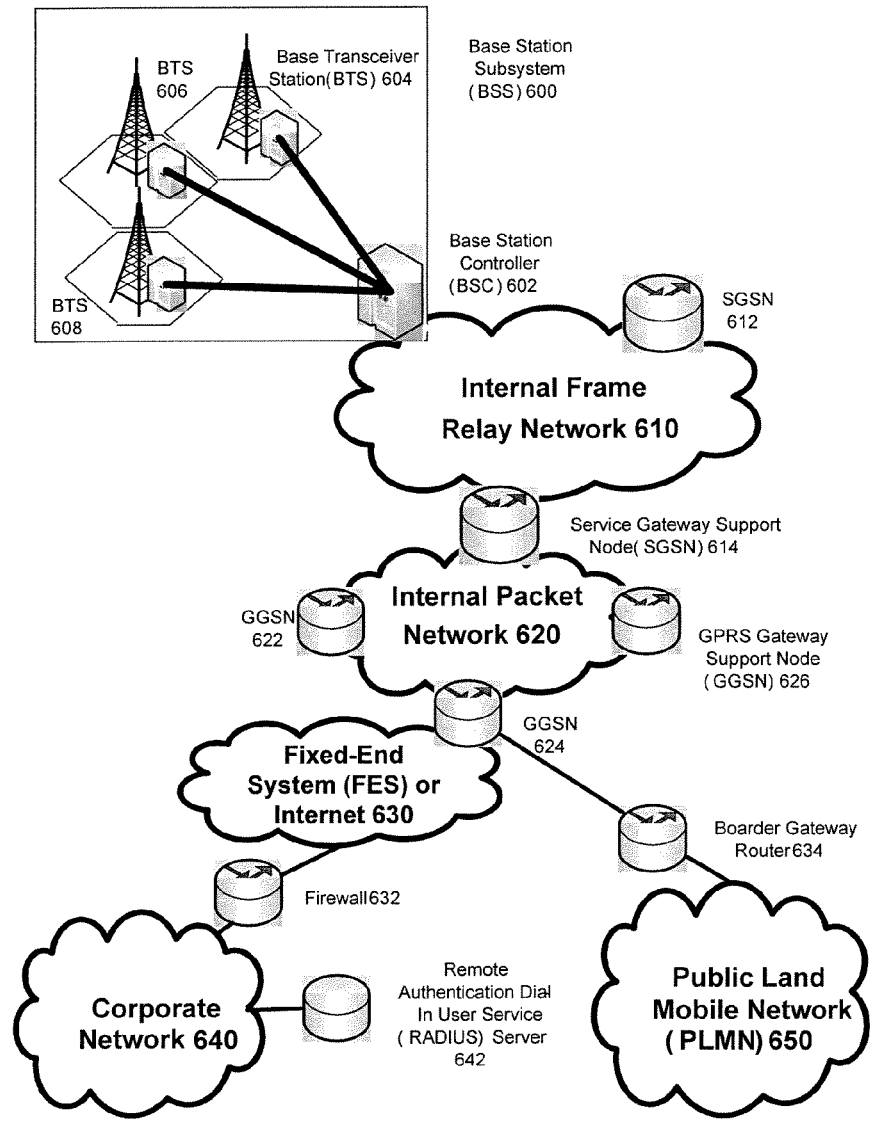
FIG. 5 is an overall block diagram of an exemplary packet-based mobile cellular network environment, such as a GPRS network, in which providing information pertaining to a motor vehicle can be implemented.

FIG. 5 depicts an overall block diagram of an exemplary packet-based mobile cellular network environment, such as a GPRS network, in which the system of the present subject matter can be practiced. In an example configuration, wireless provider network comprises a cellular radio network and towers which are encompassed by the network environment depicted in FIG. 5. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 6:
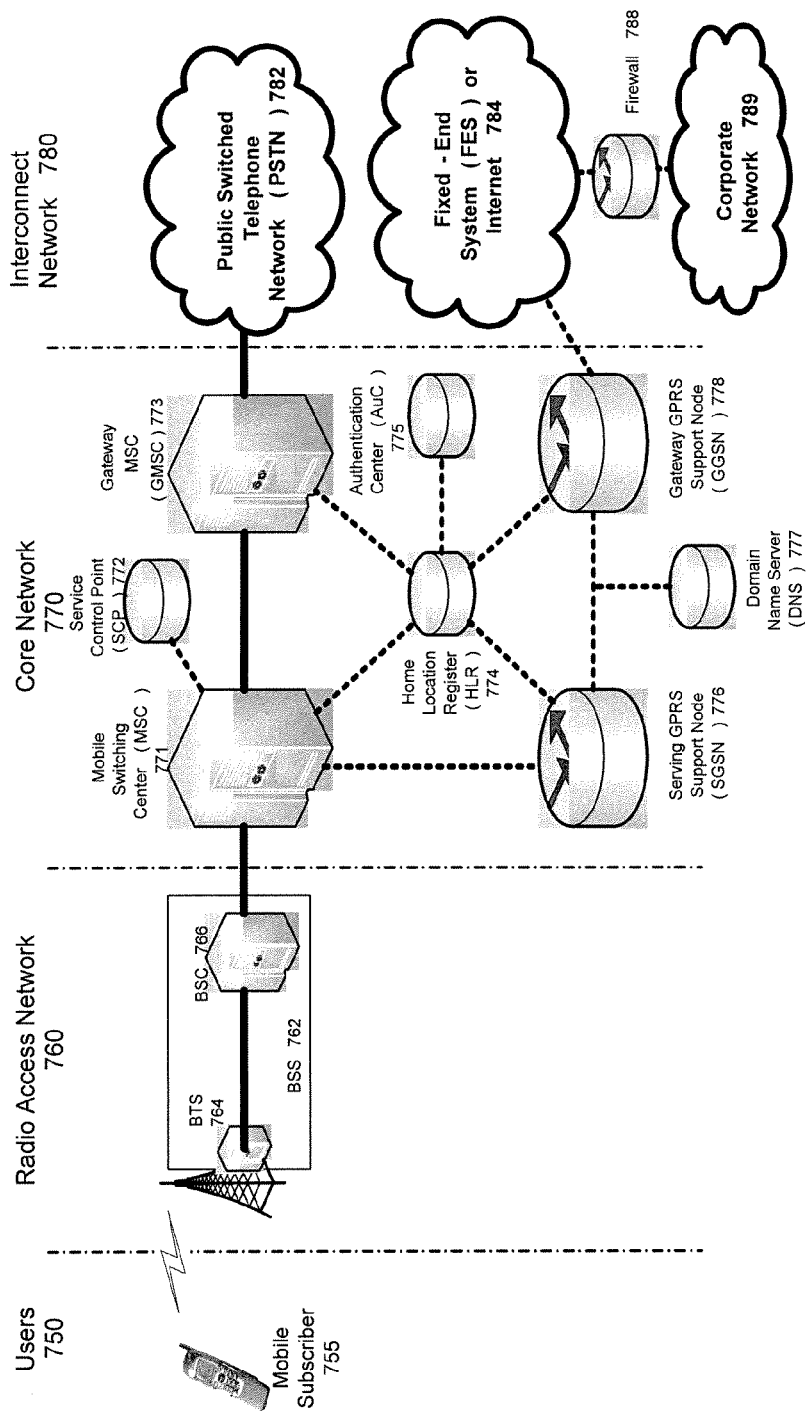
FIG. 6 illustrates an architecture of a typical GPRS network as segmented into four groups.

FIG. 6 illustrates an architecture of a typical GPRS network as segmented into four groups: users 750, radio access network 760, core network 770, and interconnect network 780. In one example configuration, wireless provider network is encompassed by the radio access network 760, core network 770, and interconnect network 780. Users 750 comprise a plurality of end users (though only mobile subscriber 755 is shown in FIG. 6). In an example embodiment, the device depicted as mobile subscriber 755 comprises a mobile device. In an alternate embodiment, the device depicted as mobile subscriber 755 comprises navigation system 300. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device or a navigation system, used by an end user of the mobile cellular service. When a mobile subscriber turns on his or her mobile device, the mobile device goes through an attach process by which the mobile device attaches to an SGSN of the GPRS network. In FIG. 6, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 6) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of the present subject matter can include but is not limited to Gateway GPRS Support Node tables, Fixed End System router tables, firewall systems, VPN tunnels, and any number of other network elements as required by the particular digital network.

Figure 7:
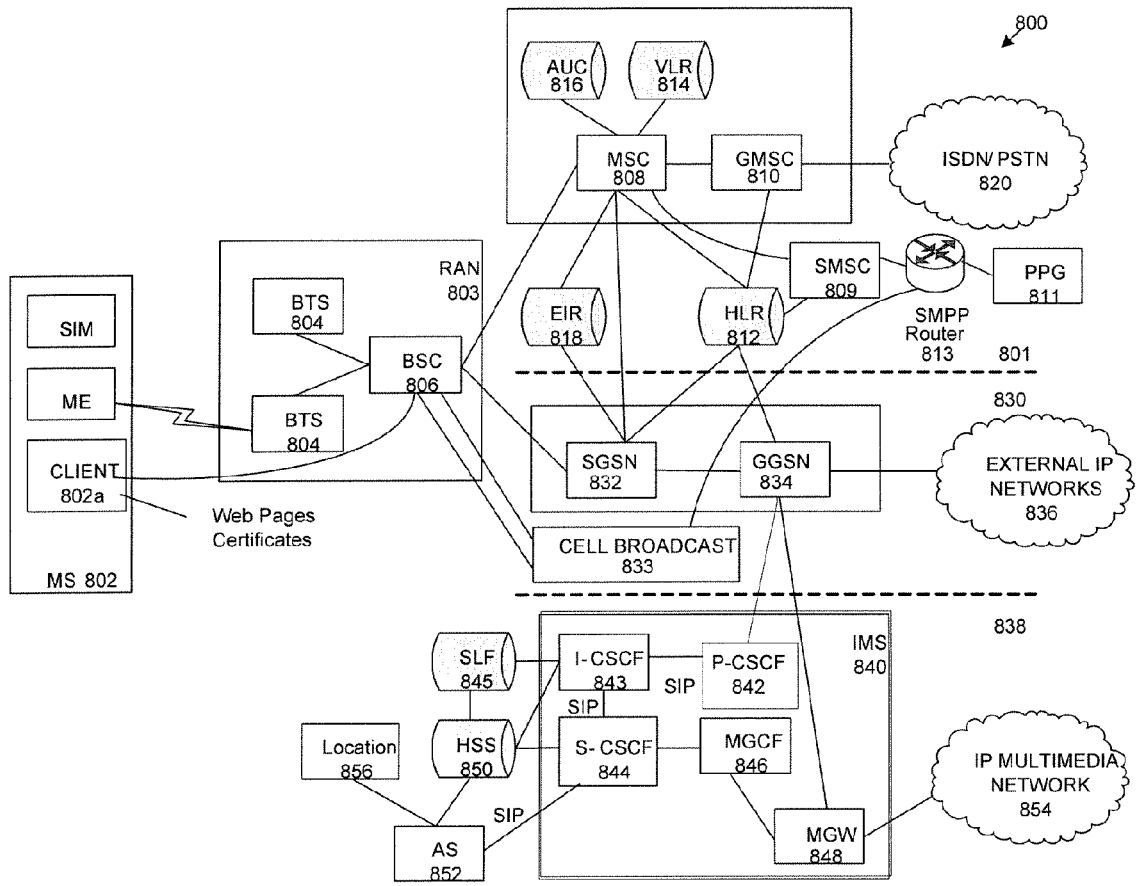
FIG. 7 illustrates an example alternate block diagram of an exemplary GSM/GPRS/IP multimedia network architecture in which providing information pertaining to a motor vehicle can be implemented.

FIG. 7 illustrates another exemplary block diagram view of a GSM/GPRS/IP multimedia network architecture 800 in which a system for providing information pertaining to a motor vehicle can be incorporated. As illustrated, architecture 800 of FIG. 7 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AUC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification.)

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown.) It also controls the media gateway (MGW) 848 that provides user-plane interworking functionality (e.g., converting between AMR- and PCM-coded voice.) The MGW 848 also communicates with other IP multimedia networks 854.

Push to Talk over Cellular (PoC) capable mobile phones register with the wireless network when the phones are in a predefined area (e.g., job site, etc.) When the mobile phones leave the area, they register with the network in their new location as being outside the predefined area. This registration, however, does not indicate the actual physical location of the mobile phones outside the pre-defined area.

While example embodiments of the present subject matter have been described in connection with various computing devices, the underlying concepts can be applied to any computing device or system capable of implementing the present subject matter. The various techniques described herein can be implemented in connection with hardware or software or, where appropriate, with a combination of both. Thus, the methods and apparatus for providing information pertaining to a motor vehicle, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing the present subject matter. In the case of program code execution on programmable computers, the computing device will generally include a processor, a storage medium readable by the processor (including volatile and non-volatile memory and/or storage elements), at least one input device, and at least one output device. The program (s) can be implemented in assembly or machine language, if desired. In any case, the language can be a compiled or interpreted language, and combined with hardware implementations.

The methods and apparatus for providing information pertaining to a motor vehicle also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing information pertaining to a motor vehicle. When implemented on a general-purpose processor, the program code combines with the processor to provide a unique apparatus that operates to invoke the functionality of the present subject matter. Additionally, any storage techniques used in connection with the present subject matter can invariably be a combination of hardware and software.

While the present subject matter has been described in connection with the various embodiments of the various figures, it is to be understood that other similar embodiments can be used or modifications and additions can be made to the described embodiment for performing the same function of providing information pertaining to a motor vehicle without deviating therefrom. For example, one skilled in the art will recognize that a system for providing information pertaining to a motor vehicle as described may apply to any environment, whether wired or wireless, and may be applied to any number of devices connected via a communications network and interacting across the network. Therefore, providing information pertaining to a motor vehicle should not be limited to any single embodiment, but rather should be construed in breadth and scope in accordance with the appended claims.

What is claimed:

1. A method comprising:
    receiving monitored characteristics of a motor vehicle, the monitored characteristics comprising:
        an indication as to whether the motor vehicle is within a predetermined range of operation based on a location of the motor vehicle; and
        an indication as to whether the motor vehicle is being handled within predetermined parameters based at least in part on:
            a speed of the motor vehicle;
            a sharpness of a turn of the motor vehicle;
            an engine temperature the motor vehicle;
            an oil level of the motor vehicle;
            a tire pressure of the motor vehicle;
            a fuel level of the motor vehicle; and
            a deployment status of an air bag of the motor vehicle;
    prior to receiving the monitored characteristics, receiving, from a mobile device, a selection of an entity other than a subscriber of the mobile device to receive the monitored characteristics of the motor vehicle, wherein the entity was selected via a web page on the mobile device; and
    providing, in real time, the monitored characteristics of the motor vehicle to the selected entity, wherein the selected entity is not otherwise monitoring the characteristics of the motor vehicle.

2. The method of claim 1, wherein the monitored characteristics of the motor vehicle are monitored in real-time.

3. The method of claim 1, wherein the monitored characteristics are provided to the selected entity responsive to a request from a network server.

4. The method of claim 1, wherein providing the monitored characteristics to the entity comprises at least one of:
    providing the monitored characteristics to the selected entity periodically;
    providing the monitored characteristics to the selected entity upon an occurrence of an event; or
    providing the monitored characteristics to the selected entity upon request from the selected entity.

5. The method of claim 1, further comprising:
    providing instructions to the motor vehicle that prevent the motor vehicle from being started during a predetermined period of time.

6. The method of claim 5, wherein the period of time comprises a weekend.

7. The method of claim 1, further comprising conducting multi-media communications with the selected entity.

8. An apparatus comprising:
    a processor; and
    memory coupled to the processor, the memory comprising executable instructions that when executed by the processor cause the processor to effectuate operations comprising:
        receiving monitored characteristics of a motor vehicle, the monitored characteristics comprising:
            an indication as to whether the motor vehicle is within a predetermined range of operation based on a location of the motor vehicle; and
            an indication as to whether the motor vehicle is being handled within predetermined parameters based at least in part on:
                a speed of the motor vehicle;
                a sharpness of a turn of the motor vehicle;
                an engine temperature the motor vehicle;
                an oil level of the motor vehicle;
                a tire pressure of the motor vehicle;
                a fuel level of the motor vehicle; and
                a deployment status of an air bag of the motor vehicle;
        prior to receiving the monitored characteristics, receiving, from a mobile device, a selection of an entity other than a subscriber of the mobile device to receive the monitored characteristics of the motor vehicle, wherein the entity was selected via a web page on the mobile device; and
        providing, in real time, the monitored characteristics of the motor vehicle to the selected entity, wherein the selected entity is not otherwise monitoring the characteristics of the motor vehicle.

9. The apparatus of claim 8, wherein the monitored characteristics of the motor vehicle are monitored in real-time.

10. The apparatus of claim 8, wherein the monitored characteristics are provided to the selected entity responsive to a request from a network server.

11. The apparatus of claim 8, wherein providing the monitored characteristics to the entity comprises at least one of:
    providing the monitored characteristics to the selected entity periodically;

providing the monitored characteristics to the selected entity upon an occurrence of an event; or providing the monitored characteristics to the selected entity upon request from the selected entity.

12. The apparatus of claim 8, the operations further comprising:

providing instructions to the motor vehicle that prevent the motor vehicle from being started during a predetermined period of time.

13. The apparatus of claim 12, wherein the period of time comprises a weekend.

14. The apparatus of claim 8, the operations further comprising conducting multi-media communications with the selected entity.

15. A computer readable storage medium that is not a propagating signal, the computer readable storage medium comprising executable instructions that when executed by a processor cause the processor to effectuate operation comprising:

receiving monitored characteristics of a motor vehicle, the monitored characteristics comprising:

an indication as to whether the motor vehicle is within a predetermined range of operation based on a location of the motor vehicle; and an indication as to whether the motor vehicle is being handled within predetermined parameters based at least in part on:

a speed of the motor vehicle;

a sharpness of a turn of the motor vehicle;

an engine temperature the motor vehicle;

an oil level of the motor vehicle;

a tire pressure of the motor vehicle;

a fuel level of the motor vehicle; and a deployment status of an air bag of the motor vehicle;

prior to receiving the monitored characteristics, receiving, from a mobile device, a selection of an entity other than a subscriber of the mobile device to receive the monitored characteristics of the motor vehicle, wherein the entity was selected via a web page on the mobile device; and providing, in real time, the monitored characteristics of the motor vehicle to the selected entity, wherein the selected entity is not otherwise monitoring the characteristics of the motor vehicle.

16. The computer readable storage medium of claim 15, wherein the monitored characteristics of the motor vehicle are monitored in real-time.

17. The computer readable storage medium of claim 15, wherein the monitored characteristics are provided to the selected entity responsive to a request from a network server.

18. The computer readable storage medium of claim 15, wherein providing the monitored characteristics to the entity comprises at least one of:

providing the monitored characteristics to the selected entity periodically;

providing the monitored characteristics to the selected entity upon an occurrence of an event; or providing the monitored characteristics to the selected entity upon request from the selected entity.

19. The computer readable storage medium of claim 15, the operations further comprising:

providing instructions to the motor vehicle that prevent the motor vehicle from being started during a predetermined period of time.

20. The computer readable storage medium of claim 19, wherein the period of time comprises a weekend.

21. The computer readable storage medium of claim 15, the operations further comprising conducting multi-media communications with the selected entity.

* * * * *